United States Patent [19]
Allen et al.

[11] Patent Number: 5,581,664
[45] Date of Patent: Dec. 3, 1996

[54] CASE-BASED REASONING SYSTEM

[75] Inventors: Bradley P. Allen, Hermosa Beach; S. Daniel Lee, San Gabriel, both of Calif.

[73] Assignee: Inference Corporation, Novato, Calif.

[21] Appl. No.: 247,630

[22] Filed: May 23, 1994

Related U.S. Application Data

[63] Continuation of Ser. No. 664,561, Mar. 4, 1991, abandoned.

[51] Int. Cl.$^6$ .................................................. G06F 15/18
[52] U.S. Cl. ................... 395/51; 395/12; 395/77
[58] Field of Search .................... 395/77, 51, 12

[56] References Cited

U.S. PATENT DOCUMENTS

| | | | |
|---|---|---|---|
| 4,648,062 | 3/1987 | Johnson et al. | 364/900 |
| 4,930,071 | 5/1990 | Tou et al. | 364/300 |
| 5,103,498 | 4/1992 | Lanier et al. | 395/68 |
| 5,122,972 | 6/1992 | Richards et al. | 395/157 |
| 5,136,686 | 8/1992 | Koza | 395/13 |
| 5,224,206 | 6/1993 | Simoudis | 395/77 |
| 5,255,386 | 10/1993 | Prager | 395/600 |
| 5,287,448 | 2/1994 | Nicol et al. | 395/159 |

FOREIGN PATENT DOCUMENTS

| | | |
|---|---|---|
| 9207325 | 4/1992 | WIPO . |

OTHER PUBLICATIONS

Riesbeck, C. K., "An Interface for Case–Based Knowledge Acquisition", Proc. Workshop on Case–Based Reasoning, May 10–13, 1988, pp. 312–326.

Skalak, D. B., "Options for Controlling Mixed Paradigm Systems," Proc. Workshop on Case–Based Reasoning, Jun. 1989, 318–323.

Simoudis, et al, "Validated Retrieval in Case–Based Reasoning," AAA I–90, Aug. 1990, 310–315.

Pallatto, J., "New Art–1M features to aid expert–system development," PC Week, Aug. 27, 1990, 67(2).

Goodman, M., "Prism: A Case–Based Texex Classifier," Proc. Innovative Applications of Artificial Intelligence 2, 1990, 25–37.

Software Product Specification for ESTEEM v1-1, Esteem Software, Inc., Released 1991.

Explanation Based Indexing of Case; Barletta et al; Proc. of AAAI–88; St. Paul, MN; August 1988.

Combining Case–Based and Rule–Based Reasoning: A Heuristic Approach; Rissland et al/ IJCAI; vol. 1; pp. 524–530; 1989.

A Generalized Case Based Reasoning System For Personnel Performance Evaluation; Chi et al; Proc. 24th Annual Hawaii Inter. Conf. on System Sciences; 8–11 Jan. 1991; pp. 82–89.

Integrating Case–Based Reasoning With Genetic Algorithms; Computational Intelligence, III; Oppacher et al; Conference Date 24–28 Sep. 1990; pp. 103–114.

(List continued on next page.)

*Primary Examiner*—Robert W. Downs
*Attorney, Agent, or Firm*—D'Alessandro & Ritchie

[57] ABSTRACT

A case-based reasoning system which is smoothly integrated into a rule-based reasoning system, thus coordinating case-based reasoning techniques and rule-based reasoning techniques in a unified automated reasoning system, in which an automated processor may proceed by inferential reasoning on the facts of the problem and the cases by means of rule-based reasoning techniques or based on procedural directives supplied by a human programmer, and may select the case which is the best match for the problem, but may act differently from the precise action prescribed for that case. A technique for dynamically adapting the case base to the problems which the automated reasoning system encounters, in which the processor may create additional cases which may exemplify the problem or which may be useful for future problems, or may remove cases from the case base which it determines from experience are poor or obsolete. A technique in which the processor may be set to work with a limited case base, and may solicit human advice for treatment of new problems which are not already well-treated by the case base.

38 Claims, 12 Drawing Sheets

OTHER PUBLICATIONS

Combining Case-Based and Rule Based Reasoning: A Heuristic Approach; IJCAI 1989; Rissland et al; vol. 1; pp. 524-530.

Explanation Based Indexing of Cases; Proc. of AAAI-88; Baretta et al; Aug. 1988.

An Interface For Case-Based Knowledge Acquistion; Proc. Workshop On Case-Based Reasoning; Riesbeck; May 10-13, 1988; pp. 312-326.

Credit Assignment and the Problem of Competing Factors in Case-Based Reasoning; Proc. Workshop on Case-Based Reasoning; Rissland et al; May 10-13, 1988, pp. 327-344.

Case Based Reasoning for Continouous Control; Proc. Workship on Case-Based Reasoning; Kopeikina et al; May 10-13, 1988; pp. 250-259.

Some Experiments With Case-Based Search; Proc. Workshop on Case-Based Reasoning; Bradtke et al; May 10-13, 1988; pp. 80-93.

Clavier: A Case Based Autoclave Loading Advisor; David Hinkle; Mar. 9, 1990.

Using a Case Memory to Integrated Case-Based and Causal Reasoning; Case-Based Reasoning Workshop; Phyliss Koton; Aug. 23, 1988; pp. 74-81.

Frakes, et al., "Using Expert-System Components to Add Intelligent Help and Guidance to Sofware Tools", AT & T Bell Laboratories, Sep. 1989.

Prager, et al., "REASON An Intelligent User Assistant for Interactive Environments", IBM Systems Journal, vol. 29, No. 1, 1990, pp. 141-164.

Breuker, et al., "A Shell for Intelligent Help Systems", Cognitive Modeling, Dec. 1987, pp. 167-173.

Extending Problem Solver Capabilities Through Case-Based Inference; Janet L. Kolodner; Proceeding 4th Annual Int'l Machine Learning Workshop; 1987; pp. 21-30.

Venta, O. and Kohonen, T., *A Content-Addressing Software Method for the Emulation of Neural Networks*, Helsinki University of Technology.

Allen, B. P. and Lee, S. D., *A Knowledge-Based Environment for the Development of Software Parts Composition Systems*, Proceedings of the 11th International Conference on Software Engineering, IEEE, May, 1989.

Willett, P., *Recent Trends in Hierarchic Document Clustering: A Critical Review*, Information Processing & Management, vol. 24, No. 5, pp. 577-597, 1988.

Can, F. and Ozkarahan, E. A., *Dynamic Cluster Maintenance*, Information Processing & Management, vol. 25, No. 3, pp. 275-291, 1989.

Parodi, A. and Bonelli, P., *The Animat and the Physician*, pp. 50-57.

Brooks, R. A., *Elephants Don't Play Chess*, Robotics and Autonous Systems 6, pp. 3-15, 1990.

Wood, M. and Sommerville, I., *An Information Retrieval System for Software Components*, ACM SIGIR, vol. 22, Issue 3,4, Spring/Summer 1988.

Frakes, W. B. and Nejmeh, B. A., *Sofware Reuse Through Information Retrieval*, Proceedings of IEEE Spring COMPCON '87, Mar. 1987.

Stone, H. S., *Parallel Querying of Large Databases: A Case Study*, Computer, Oct. 1987.

Batz, J. C., Chohen, P. M., Redwine, S. T. and Rice, J. R., *The Application-Specific Task Area*, Computer, Nov. 1983.

Arnold, S. P. and Stepoway, S. L., *The REUSE System: Cataloging and Retrieival of Reusable Software*, Proceedings of IEEE Spring COMPCON '87, Mar. 1987, pp. 376-379.

Prieto-Diaz, R. and Freeman, P. *Classifying Software for Reusability*, IEEE Software, vol. 4, No. 1, Jan. 1987, pp. 6-16.

Aha, D. W., Kibler, D. and Albert, M. K., *Instance-Based Learning Algorithms*, Marchine Learning, vol. 1, No. 1, Jan. 1991, pp. 37-66.

Steinberg, L. I., *Design as Refinement Plus Constraint Propagation: The VEXED Experience*, Proceedings of the National Conference on Artifical Intelligence, AAAI, Jul. 1987, pp. 830-835.

Patel-Schneider, P. F., Brachman, R. J. and Levesque, H. J. ARGON: Knowledge Representation meets Information Retrieval, Proceedings of the First Conference on Applications of Artificial Intelligence, IEEE, Dec. 1984, pp. 280-286.

Kolodner, J. L., Simpson, Jr., R. L. and Sycara-Cyranski, K. *A Process Model of Cased-Based Reasoning in Problem Solving*, Proceedings of the Ninth International Joint Conference on Artificial Intelligence, Aug. 1985, pp. 284-290.

Yen, J. Neches, R. and DeBellis, M., *Specification by Reformulation: A Paradigm for Building Integrated User Support Environments*, Proceedings of the National Conference on Artificial Intelligence, AAAI, Aug. 1988, pp. 814-818.

Fischer, G. and Nieper-Lemke, H., *Helgon: Extending the Retrieval by Reformulation Paradigm*, Proceedings of CHI '89 Human Factors in Computing Systems ACM, Apr.-May 1989, pp. 357-362.

Frakes, W. B. and Gandel, P. B., *Representation Methods for Software Reuse*, Proceedings of TRI-Ada 89, Oct. 1989, pp. 302-314.

Harandi, M. T. and Young, F. H., *Template Based Specification and Design*, Proceedings of the 3rd International Workshop on Software Specification and Design, IEEE, Aug. 1985, pp. 94-97.

Marcus, S., *SALT: A Knowledged Acquisition Tools for Propose-and -Revise Systems*, Automating knowledge Acquisition for Expert Systems, Marcus, S., Eds., Kluwer Academic, 1988, pp. 81-123.

Selby, R. W., *Quantitative Studies of Software Reuse*, Software Reusability, vol. 2, ACM Press, 1989, pp. 213-233.

Lanergan, R. G. and Grasso, C. A., *Software Engineering with Reusable Designs and Code*, Software Reusability, vol. 2, ACM Press, 1989, pp. 187-195.

Yost, G. R. and Newell, A., *A Problem Space Approach to Expert System Specification*, Proceedings of the Eleventh IJCAI, Aug. 1989, pp. 621-627.

Stottler, R. H., Henke, A. L. and King, J. A., *Rapid Retrieval Algorithms for Case-Based Reasoning*, Proceedings of the Eleventh International Joint Conference on Artificial Intelligence, Aug. 1989, pp. 233-237.

Devanbu, P., Selfridge, P. G., Ballard, B. W. and Brachman, R. J., *A Knowledge-Based Software Information System*, Proceeding of the Eleventh International Joint Conference on Artificial Intellignece, Aug. 1989, pp. 110-115.

Embley, D. W. and Woodfield, S. N., *A Knowledge Structure for Reusing Abstract Data Types*, Proceedings of the 9th International Conference on Software Engineering, IEEE, Mar.-Apr. 1987, pp. 360-368.

Allen, B. P. and Lee, S. D., *A Knowledge-Based Environment for the Development of Software Parts Composition Systems,* Proceedings of the 11th International Conference on Software Engineering, IEEE, May 1989, pp. 104–112.

Bareiss, E. R. and Porter, B. W., *PROTOS: An Exemplar-Based Learning Apprentice,* Proceedings of the Fourth International Workshop on Machine Learning, Jun. 1987, pp. 12–23.

Williams, M. D., *What makes RABBIT run?, International Journal of Man-Machine Studies, vol. 21, 1984, pp. 333–352.*

Williams, R. S., *Learning to Program by examining and Modifying Cases,* Proceedings of the DARPA Workshop on Case-Based Reasoning, May 1988, pp. 463–474.

Venta, O. and Kohonen, T., *A Content-Addressing Software Method for the Emulation of Neural Networks, Proceedings of the IEEE International Conference on Neural Networks 1988, Jul. 1987, If–191 to I–198.*

Williams, M. D., *The Process of Retrieval from Very Long-Term Memory.* Cognitive Science 5, 1981, pp. 87–119.

DARPA, *Case-Based Reasoning from DARPA: Machine Learning Program Plan,* Proceedings of the 1989 DARPA Case-Based Reasoning Workshop, May 1989.

Stanfill, C. and Waltz, D. L., *The Memory-Based Reasoning Paradigm,* Proceedings of the DARPA Workshop on Case-Based Reasoning, May 1988, pp. 414–424.

Forgy, C. L., *OPS5 User's manual,* CMU-CS-81-135, Carnegie-Mellon University Computer Science Department, 1981.

Frdge, III, E. R. *The Automated Software Development Workstation Project,* proceedings of the Evolutionary Space Station Symposium, NASA, Feb. 1990.

Hendler, J. A. Wong, Y. C. Viciguerra, A. and Mogliensky J., *AIRS: An AI-Based Ada Reuse Tool,* Proceedings of AIDA-87, Nov. 1987.

Inference Corporation, *ART-IM 2.0 Reference manual,* Inference Corporation, 1989.

Kohonen, T., *Self∝Organization and Associative Memory, Springer-Verlag, 2nd Ed., 1988.*

Kohonen, T., *Content-Adressable Memories,* Springer-Verlag, 2nd Ed., 1988.

McDowell, R. C. and Cassell, K. A., *The RLF Librarian: A Reusability Librarian Based on Cooperating Knowledge∝Based Systems,* Proceedings of Fourth Annual Knowledge-Based Software Assistant Conference, RADC, Sep. 1989.U.S. Naval Observatory, *Almanac for Computers 1988,* U.S. Government Printing Office, 1988.

Salton, G., *Automatic Text Processing,* Addison-Wesley, 1989.

Yen, J., Neches, R. and DeBellis, M., *Backbord: Beyond Retrieval by Reformulation,* ISI/RS-99-202, USC ISI, Mar. 1988.

Risch, T. et al., *A Functional Approach to Integrating Database and Expert System,* Communications of the ACM, vol. 31, No. 12, pp. 1424–1437, Dec. 1988.

Koton, Phyllis, Reasoning about Evidence in Causal Explanations, MIT Laboratory for Computer Science, Procedural Workshop on Case-Based Reasoning, pp. 260–270, (May 13, 1988).

Search Panel

CBR Express 1.0 Beta

File  Edit  Panels                              Help

Description:
customer requests price adjustment;
purchased merchandise day before sale

Questions about this Problem: | Browse Question | Answers:
What was the method of payment? | | revolving charge

Recommended Actions: | Browse Action | Show Cases
73 Price adjustment, revolving charge Search Case Base | New Search | End Search >> | Unresolved Search

FIG. 6B

Case Panel

CBR Express 1.0 Beta

File  Edit  Panels                                                              Help Title [Appears on the Search panel]:                        Key: Case1

Price adjustment, revolving charge

Description [Text for Case matching]:

Revolving charge customer needs price adjustment on sale item.

Questions:                    Add...    New >>    Browse    Remove    Answers:

What was the method of payment?                                        revolving charge Actions:                      Add...    New >>    Browse    Remove Credit customer's account with the difference between purchase and sale price.

Save Case    Delete Case    New Case    Test Case >>    Browse...

Action Panel

Action [Appears on Search panel]:     Key: Action B

Credit the price difference to the customer's charge account.

Additional information:

Credit the difference between the purchase price and the discounted sale price to the customer's charge account.

Cases that recommend this action:     Browse Case

Save and Return >>     Delete Question     New Question     Browse...

*FIG. 6E*

CASE-BASED REASONING SYSTEM

CROSS-REFERENCE TO RELATED APPLICATION

This is a file-wrapper continuation of patent application Ser. No. 07/664,561, filed Mar. 4, 1991, now abandoned.

BACKGROUND OF THE INVENTION

1. Field of the Invention

This invention relates to case-based reasoning and to a case-based reasoning component of a rule-based reasoning system.

2. Description of Related Art

While computers are capable of tremendous processing power, their ability to use that processing power for reasoning about complex problems has so far been limited. Generally, before a computer can be used to address a complex problem, such as one which requires the attention of a human expert, it has been necessary to distill the knowledge of that expert into a set of inferential rules (a "rule base") which allow an automated processor to reason in a limited field of application. While this method has been effective in some cases, it has the natural drawback that it often requires a substantial amount of time and effort, by both computer software engineers and experts in the particular field of application, to produce a useful product.

Moreover, rule-based systems of this type present a difficult programming task. Unlike more prosaic programming tasks, constructing a rule base is sometimes counterintuitive, and may be beyond the ability of many application programmers. And once a rule-based system has been constructed based on the knowledge of a human expert, it may be difficult to accommodate Changes in the field of operation in which the processor must operate. Such changes might comprise advances in knowledge about the application field, additional tasks which are intended for the processor, or changes in or discoveries about the scope of the application field.

One proposed method of the prior art is to build automated reasoning systems which operate by reference to a set of exemplar cases (a "case base"), to which the facts of a particular situation (the "problem") may be matched. The processor may then perform the same action for the problem as in the exemplar case. While this proposal has been well-received, there have been several obstacles to successful implementation of a case-based reasoning system. One obstacle has been the lack of a feature matching technique which would be successful when applied to a case base of reasonable size. Another obstacle is that case-based reasoning can be relatively inflexible when the case base is insufficiently rich.

SUMMARY OF THE INVENTION

The invention provides a case-based reasoning system which is smoothly integrated into a rule-based reasoning system, thus coordinating case-based reasoning techniques and rule-based reasoning techniques in a unified automated reasoning system. In addition to matching a problem template to a case base, an automated processor may proceed by inferential reasoning on the facts of the problem and the cases by means of rule-based reasoning techniques (or based on procedural directives supplied by a human programmer). Thus, the processor may select the case which is the best match for the problem, but may act differently from the precise action prescribed for that case.

The invention also provides for dynamically adapting the case base to the problems which the automated reasoning system encounters. In addition to matching the problem to the "best" case, in addition to reasoning on the facts of the case based on rule-based reasoning, the processor may create additional cases which may exemplify the problem or which may be useful for future problems, or it may remove cases from the case base which it determines from experience are poor or obsolete. An aspect of the invention also includes a technique in which the processor may be set to work with a limited case base, and may solicit human advice for treatment of new problems which are not already well-treated by the case base. Thus, the processor may "learn" how to the do its job on a dynamic basis.

BRIEF DESCRIPTION OF THE DRAWINGS

FIGS. 6A–6E show example display panels in detail.

DESCRIPTION OF THE PREFERRED EMBODIMENT

Figure 1:
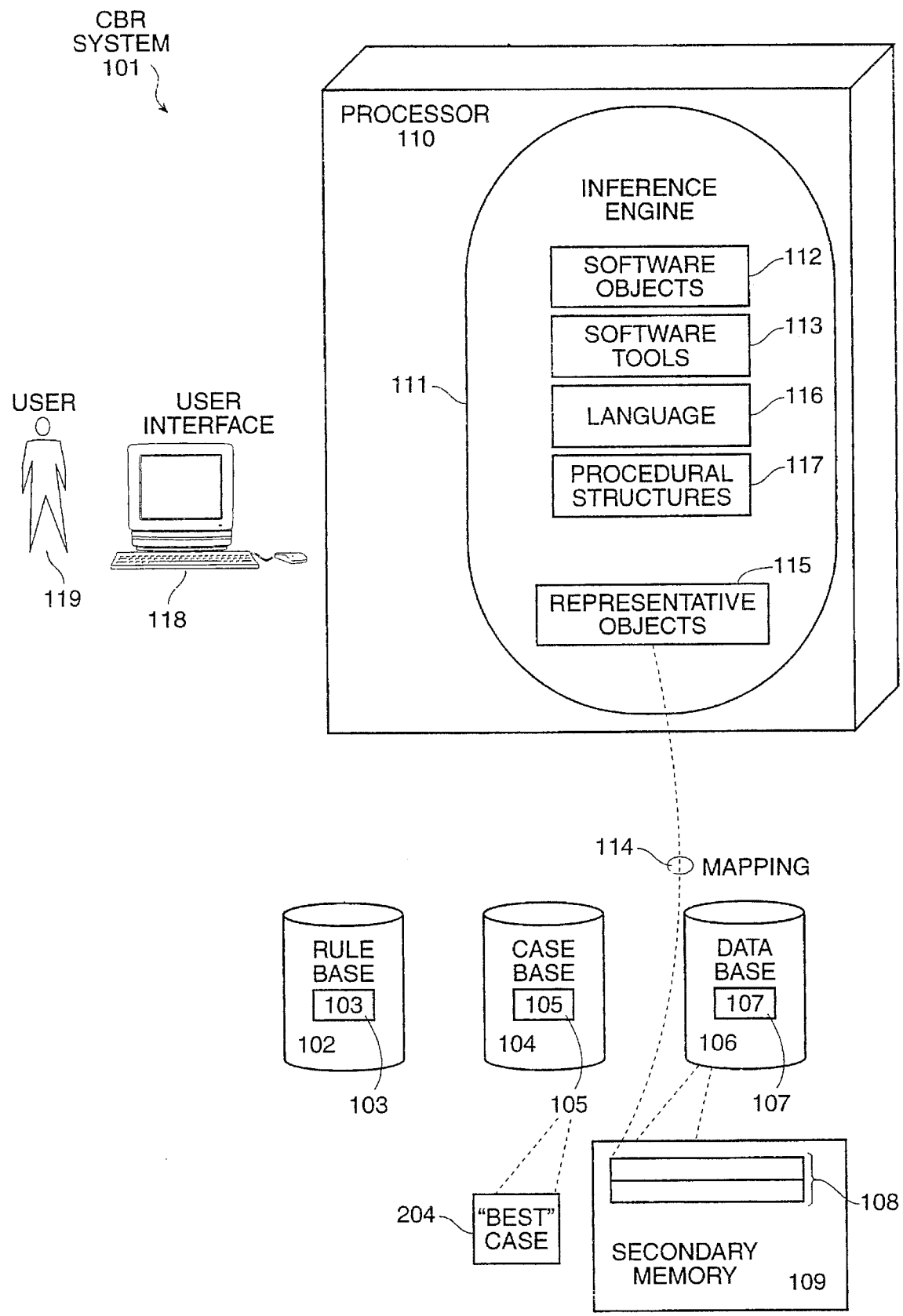
FIG. 1 shows a block diagram of a unified automated reasoning system which incorporates a case-based reasoning system.

FIG. 1 shows a block diagram of a unified automated reasoning system which incorporates a case-based reasoning system.

A case-based reasoning system 101 for a particular application field may comprises a rule base 102 of inferential rules 103 suited to that field, a case base 104 of exemplar cases 105 which are notable in that field, and a data base 106 of relevant problem data 107 for that field. In a preferred embodiment, the data base 106 may comprise a set of data records 108 stored in a secondary memory 109. For example, in a case-based reasoning system 101 for loan approval, the rule base 102 may comprise inferential rules 103 about the creditworthiness of the customer, the case base 104 may comprise exemplar cases 105 which are known to match common fact scenarios, and the data base 106 may comprise relevant problem data 107 such as loan payment histories, results of loan-officer interviews and credit-check data. In a preferred embodiment, the case base 104, rule base 102, and data base 106 may be stored in a computer memory.

An automated processor 110 may execute a software inference engine 111 for reasoning using the case base 104 and rule base 102. In a preferred embodiment, the inference engine 111 may comprise a software environment having a set of manipulable software objects 112, a set of software tools 113 for manipulating those software objects 112, for maintaining a mapping 114 between the data records 108 of the data base 106 and a set of representative objects 115 representing those data records 108, and a software language 116 for defining software objects 112 and invoking tools 113. The language 116 may also comprise software structures for defining and altering rules 103 (e.g., in the rule base 102) and cases 105 (e.g., in the case base 104) and, in a preferred embodiment, for defining and altering programming language procedural structures 117 such as software subroutines.

Figure 2:
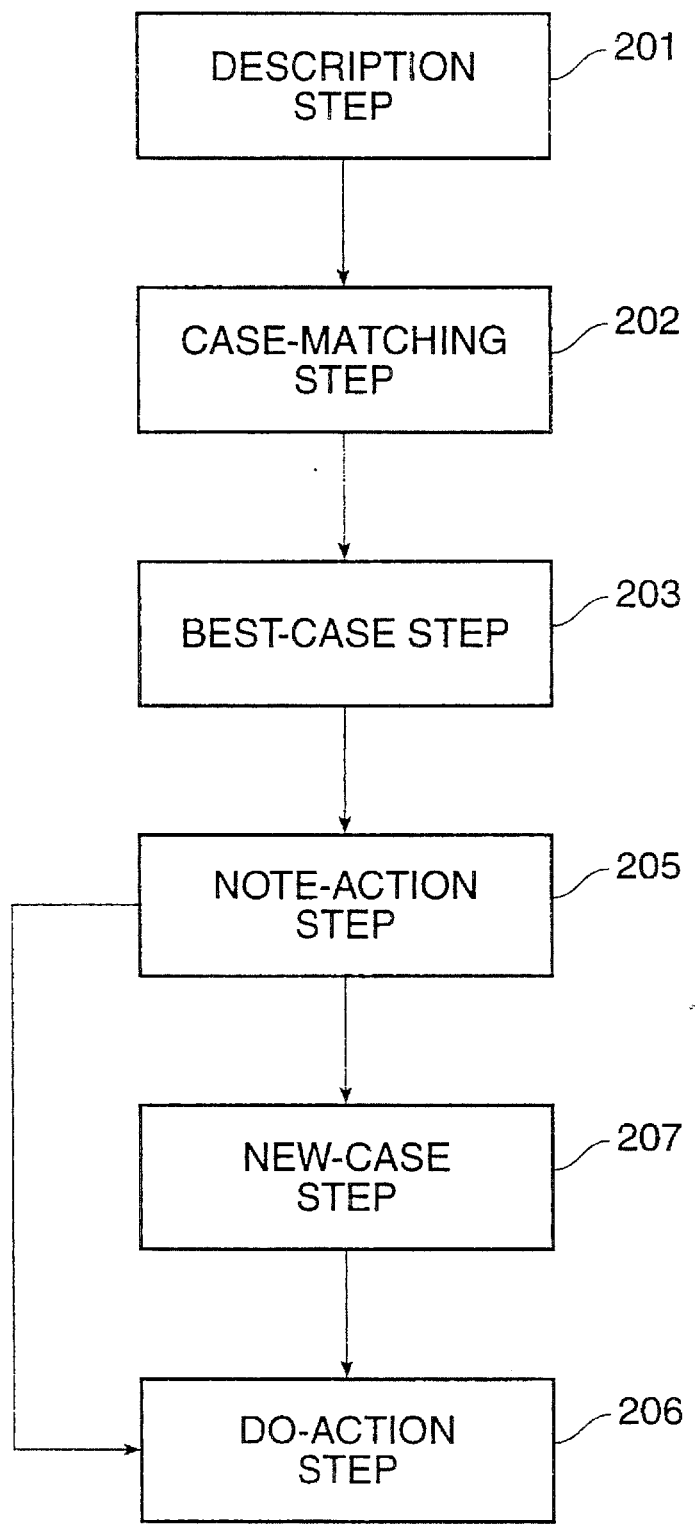
FIG. 2 shows a flow diagram for case-based reasoning.

In a preferred embodiment, the inference engine 111 may execute a flow diagram for case-based reasoning like that disclosed with FIG. 2. The inference engine 111 may also execute a flow diagram for rule-based reasoning like those which are well known in the art, including known aspects of rule-based reasoning such as attribute inheritance, hypothetical reasoning, and retraction. A more detailed description of a flow diagram which an inference engine 111 may follow for rule-based reasoning, and of rule-based reasoning systems, may be found in "ART-IM Reference Manual" available from Inference Corporation of El Segundo, Calif., and hereby incorporated by reference as if fully set forth herein.

In a preferred embodiment, the processor 110 may also comprise a user interface 118, to interact with a human operator or user 119. The user interface 118 may comprise an interactive terminal at which the user 119 may enter commands or data and at which the processor 110 may present information or questions to the user 119. In a preferred embodiment, the user interface 118 may be used either for development of cases 105, rules 103, or procedural structures 117 for use in the application field, or for use by the end user 119 in the application field, but it may be preferred for some application fields to provide one user interface 118 for development and a different user interface 118 for use by the end user 119.

In a preferred embodiment, the automated processor 110 may comprise a system having a processor, memory comprising a stored program, memory comprising data, and input/output devices, as is well known in the art. The operation and software structures of this system are described herein in terms of their functions and at a level of detail which would be clear to those of ordinary skill in the art. It would be clear to anyone of ordinary skill in the art, after perusal of the specification, drawings and claims herein, that modification and/or programming (using known programming techniques) of a processor of known design to achieve these functions would be a straightforward task and would not require undue experimentation.

In a preferred embodiment, the processor 110 may comprise an IBM-compatible PC configured to be able to execute the MicroSoft Windows 3.0 and DOS 3.1 software, and having a hard disk drive, a mouse, and a VGA display. At least a 286 processor with four megabytes of memory is preferred; a 386 processor with eight megabytes of memory is more preferred. The MicroSoft Windows 3.0 software is preferably executed in 386 enhanced mode.

FIG. 2 shows a flow diagram for case-based reasoning.

In a description step 201, the inference engine 111 retrieves a description of the facts of a particular situation (the "problem"). In a preferred embodiment, the user 119 may enter data relating to the problem by means of the user interface 118. For example, the user 119 may complete an on-screen form, or may answer a set of questions provided by data-gathering software in the inference engine 111.

In a case-matching step 202, the inference engine 111 attempts to match the problem to one or more cases 105 in the case base 104. In a preferred embodiment, the inference engine 111 may use a feature-matching technique like that described with FIGS. 3A and 3B.

In a best-case step 203, the inference engine 111 attempts to evaluate the cases 105 which were found in the case-matching step 202, and determine a "best" case 204 to match the problem. In a preferred embodiment, the inference engine 111 may present a sequence of questions to the user 119 and retrieve answers from the user 119 about the problem and the cases 105 which were found.

In a note-action step 205, the inference engine 111 determines the action prescribed by the "best" case 204, and attempts to determine if that action is a correct action to perform. If so, the inference engine 111 proceeds to a do-action step 206. Otherwise, the inference engine 111 proceeds to a new-case step 207.

In the new-case step 207, the inference engine 111 adds a new case 105 to the case base 104. In a preferred embodiment, the inference engine 111 may retrieve information to enter into the case base 104 from the user 119 by means of the user interface 118, including the correct action to perform. The inference engine 111 then proceeds to the do-action step 206.

In the do-action step 206, the inference engine 111 performs the action that was previously determined to be correct. For example, the inference engine 111 may present the user 119 with a suggested solution to the problem.

Figure 3A:
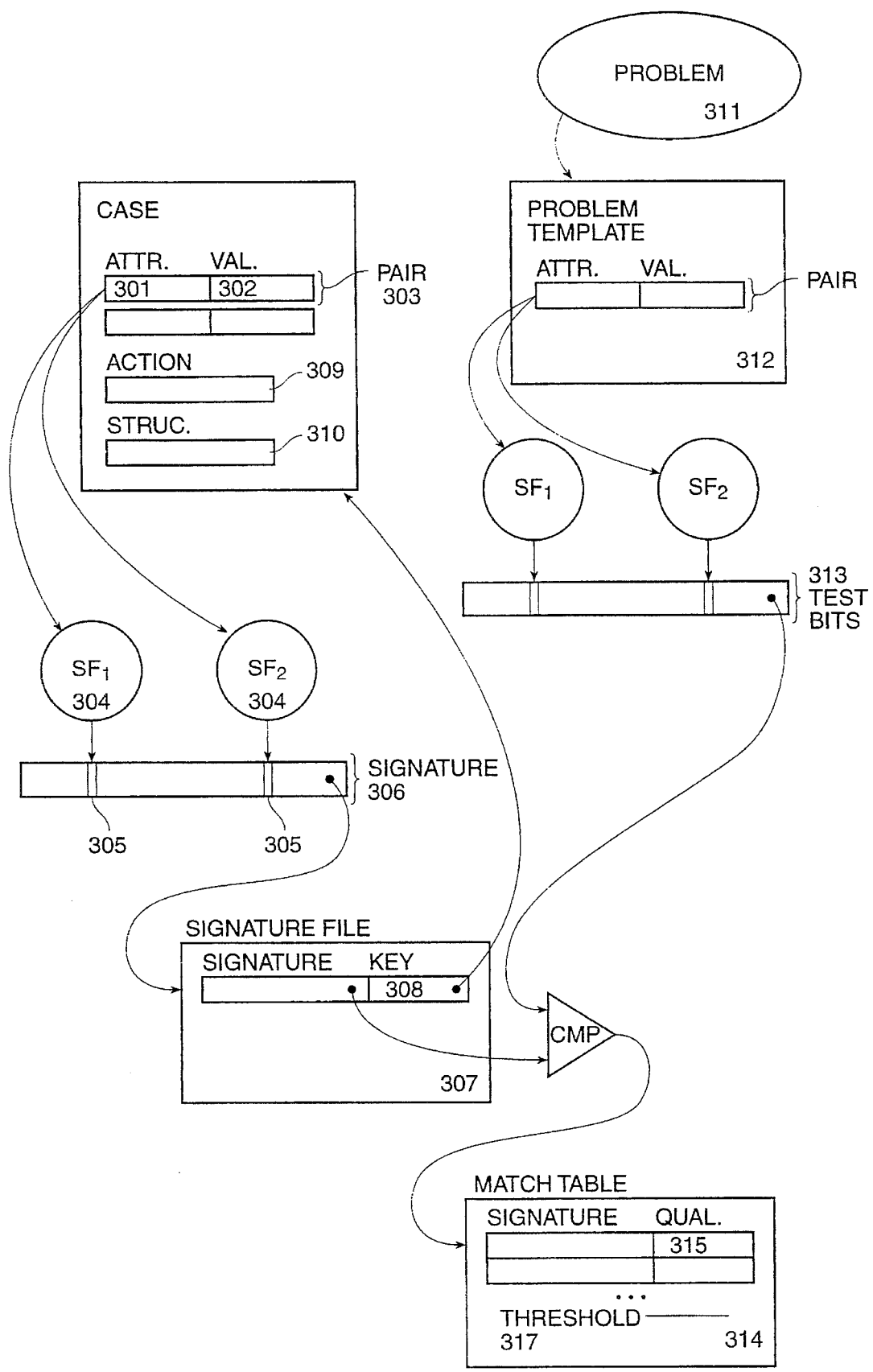
FIG. 3A shows a data flow diagram of a first feature-matching technique for matching a problem to one or more cases in a case base.

FIG. 3A shows a data flow diagram of a first feature-matching technique for matching a problem to one or more cases 105 in the case base 104.

Each case 105 may be manipulated as a software object 112 in the inference engine 111 software environment. Each case 105 may comprise a set of attributes 301, each of which has a value 302. Attributes 301 and values 302 are typically manipulated as an attribute-value pair 303. In a preferred embodiment, attributes 301 may be particular to the application field, and values 302 may have data types which vary from one attribute 301 to another. For example, in a case-based reasoning system 101 for loan approval, each case 105 might have an attribute 301 such as "loan amount" which would have a numeric value 302, an attribute 301 such as "approved" which would have a boolean value 302, and an attribute 301 such as "payment history" which would have a value 302 which is a list or array structure.

In a preferred embodiment, data types for attributes 301 may comprise (a) a yes/no data type, i.e., a one-bit boolean value, (b) a numeric data type, (c) a text string data type, and (d) a multiple-choice data type, i.e., a data type in which the value 302 must be selected from a predetermined set of possible values 302.

Each case 105 may have one or more signature functions 304 applied to each of its attribute-value pairs 303. Each signature function 304 may generate one or more signature bits 305 in a bit-string signature 306 for the case 105. In a preferred embodiment, two signature functions 304 each generate one signature bit 305 apiece, and the resultant signature bits 305 are logical-OR-ed together to generate the signature 306.

The signatures 306 for all cases 105 may be combined in one or more signature files 307, each of which maps a set of signatures 306 to a set of keys 308. The keys 308 may be used to reference the cases 105 as manipulable software objects 112, with all of their attribute-value pairs 303, an action 309 prescribed for each case 105, and a supplemental structure 310 of software objects 112 which may be kept by the inference engine 111 with each case 105. In a preferred embodiment, one signature file 307 may be maintained for each case base 104.

To match a problem 311 to the cases 105 in the case base 104, a case template 312 may be constructed for the problem 311 with attribute-value pairs 303 which correspond to notable parameters of the problem 311. The signature functions 304 may be applied to the attributes 301 (and their values 302) of the case template 312. Each attribute-value pair 303 for the case template 312 may therefore generate a set of test bits 313 to be matched against the signatures 306 in the signature file 307. In a preferred embodiment, each signature 306 in the signature file 307 may be logical-ANDed together with the test bits 313, and may generate a hit whenever a signature 306 in the signature file 307 has all the test bits 313 for a particular attribute-value pair 303 set to logical "1".

Cases 105 which are hits may be noted in a match table 314. The cases 105 in the match table 314 may be evaluated for a match quality 315, and the match quality 315 for each case 105 may be recorded in the match table 314. In a preferred embodiment, the inference engine 111 may determine match quality 315 for each case 105 in the match table 314 by a weighted sum of an evaluation 316 of those attribute-value pairs 303 which are matched. In a preferred embodiment, the weights assigned to each attribute-value pair 303 may be predetermined and may be altered by the user 119. The evaluation 316 of matched attribute-value pairs 303 may be like that disclosed with FIG. 4A or 4B.

In a preferred embodiment, cases 105 which are hits may have their match quality 315 compared against a quality threshold 317, and those cases 105 which best meet the quality threshold 317 may be stored in the match table 314, up to the size of the match table 314. In a preferred embodiment, the quality threshold 317 and the size of the match table 314 may be predetermined and may be altered by the user 119.

Figure 3B:
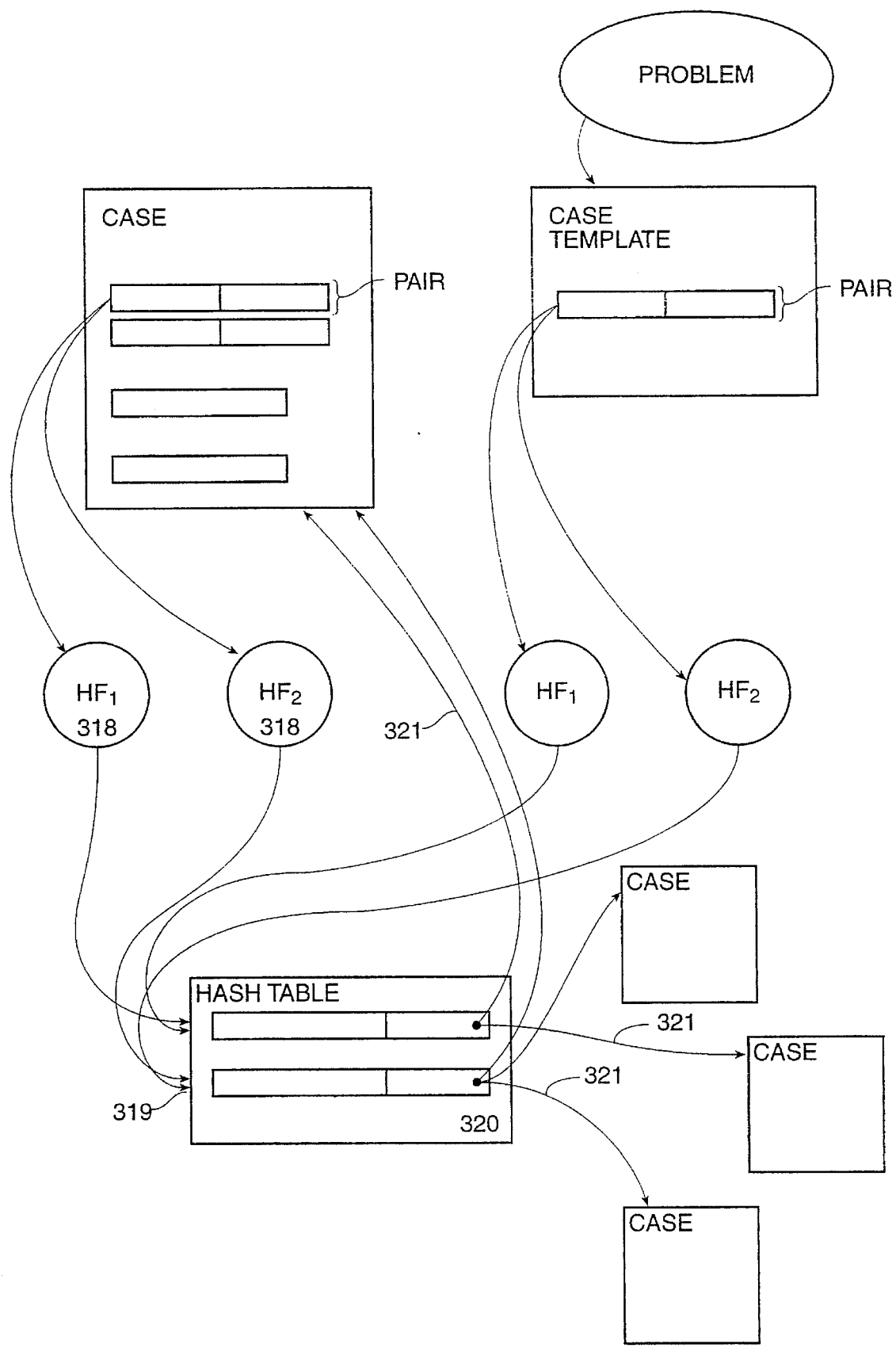
FIG. 3B shows a data flow diagram of a second such feature-matching technique.

FIG. 3B shows a data flow diagram of a second feature-matching technique for matching a problem to one or more cases 105 in the case base 104. This feature-matching technique is presently preferred over the technique disclosed with FIG. 3A.

Each case 105 may have one or more hash functions 318 applied to each of its attribute-value pairs 303. Each hash function 318 may generate one or more locations 319 in a hash table 320 of attribute-value pairs 303. Each location 319 may comprise a set of pointers 321 to one or more cases 105 in the case base 104.

To match the case template 312 to the cases 105 in the case base 104, the hash functions 318 may be applied to a set of attributes 301 (and their values 302) of the case template 312. Each attribute-value pair 303 for the case template 312 may therefore generate a set of locations 319 in the hash table 320, and thus generate a set of pointers 321 to cases 105 in the case base 104. In a preferred embodiment, the inference engine 111 may examine the locations 319 in the hash table 320 to examine attribute-value pairs 303 further, e.g. to determine if there is a match or if the hash functions 318 generated the same location 319 by coincidence.

In a preferred embodiment, cases 105 which are hit in this manner may be noted in the match table 314 and may have their match quality 315 determined, in like manner as disclosed with FIG. 3A. Attributes 301 with numeric values 302 or with text string values 302 may be treated in like manner as disclosed with FIG. 4A or 4B.

Figure 4A:
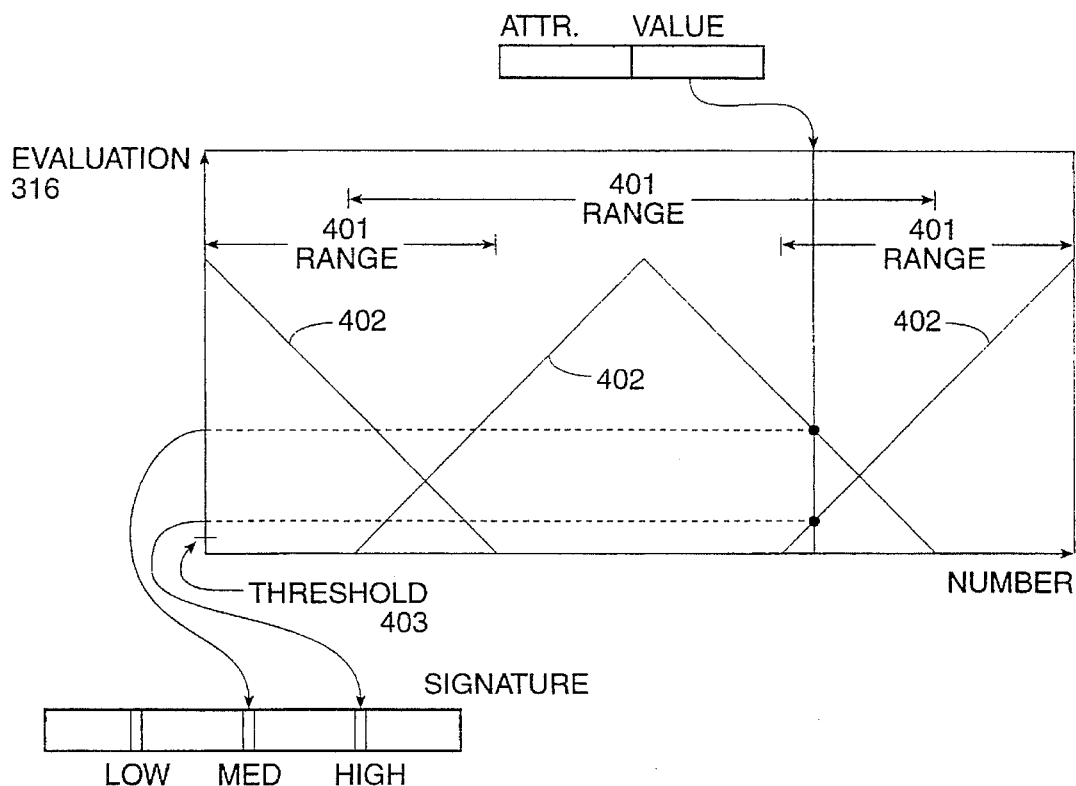
FIG. 4A shows a method for matching attribute-value pairs which have numeric values.

FIG. 4A shows a method for matching attribute-value pairs 303 which have numeric values 302.

In a preferred embodiment, attributes 301 with a numeric data type may match based on a set of one or more numeric ranges 401, such as a LOW range 401, a MEDIUM range 401 and a HIGH range 401. The inference engine 111 may compare the value 302 for the attribute 301 against the ranges 401 which are set for that attribute 301, and apply an evaluation function 402 to generate the evaluation 316 of how well each value 302 matches each range 401. The evaluation 316 may be compared against an evaluation threshold 403, and matching for that attribute-value pair 303 may proceed on the basis that the value 302 falls within the range 401. In a preferred embodiment, the evaluation function 402, the evaluation threshold 403 and the ranges 401 may be predetermined and may be altered by the user 119.

For example, for one attribute 301 the evaluation function 402 may treat values 302 of about zero as LOW, about 30 as MEDIUM and about 60 as HIGH. If the value 302 for that attribute 301 is 36, the attribute-value pair 303 will match the HIGH range 401 with the evaluation 316 of 0.2, will match the MEDIUM range 401 with the evaluation 316 of 0.8, and will not match the LOW range 401.

Figure 4B:
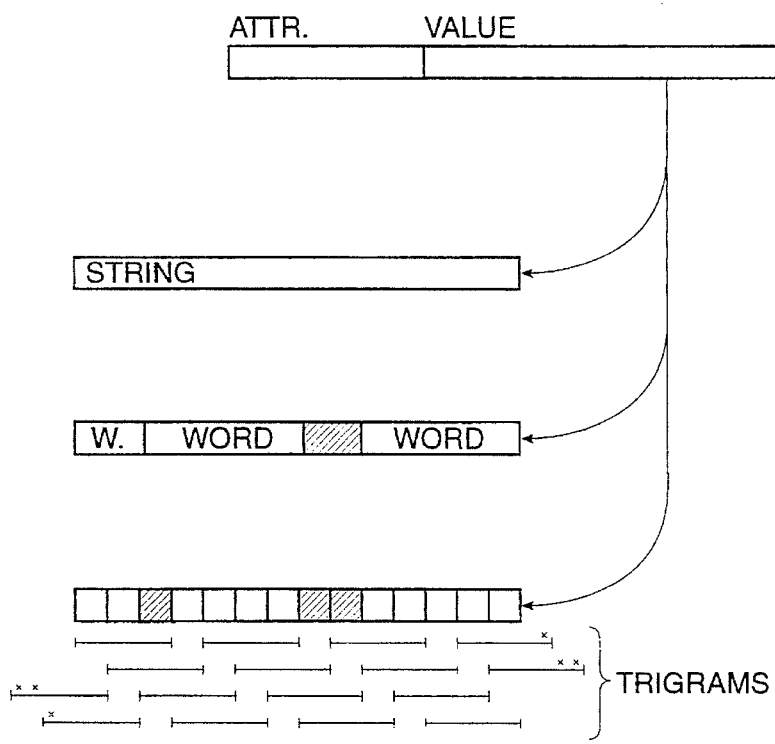
FIG. 4B shows a method for matching attribute-value pairs which have text string values.

FIG. 4B shows a method for matching attribute-value pairs 303 which have text string values 302.

In a preferred embodiment, an attribute 301 with a text string value 302 may be matched by string matching, word matching and character matching.

In string matching, the entire text string value 302 is matched exactly.

In word matching, the text string value 302 is broken up into separate words, by reference to word delimiter characters, as is well known in the art. A predetermined set of noise words, such as "a", "and" and "the", may also be removed Synonyms for the non-noise words may also be used for matching, and may be determined either globally or for a particular attribute 301. The non-noise words are each recorded as separate attribute-value pairs 303 which may be matched exactly. For example, the text string "BRADLEY P. ALLEN" would match the words "BRADLEY", "P" and "ALLEN", and if "BRAD" is a synonym for "BRADLEY", would also match "BRAD".

In character matching, the words of the text string value 302, as determined for word matching, are broken up into separate trigrams (substrings of length three). In a preferred embodiment, each word is prefixed and suffixed with two special initial/final characters prior to breaking each word into trigrams. The trigrams are each recorded as separate attribute-value pairs 303 which may be matched exactly. For example, the text string "DANIEL" would match the trigrams "xxD", "xDA", "DAN", "ANI", "NIE", "IEL", "ELx", and "Lxx", where "x" is the special initial/final character.

In a preferred embodiment, string matching, word matching and character matching are assigned weights, and the evaluation 316 of the text string match may be determined by a weighted sum of the evaluations 316 for each type of match. In a preferred embodiment, each word is assigned equal weight within word matching and each trigram is assigned equal weight within character matching.

The evaluation 316 of matched attribute-value pairs 303 may also be determined for other data types besides the numeric data type and the text string data type. In a preferred embodiment, the evaluation 316 may also be determined for matched attribute-value pairs 303 with a multiple-choice data type. For example, for a multiple-choice data type in which the choices are RED, ORANGE, YELLOW, GREEN, BLUE, and VIOLET, the evaluation 316 of matching between RED and ORANGE might be 0.8, while the evaluation 316 of matching between RED and YELLOW might be 0.4, and the evaluation 316 of matching between RED and GREEN might be zero.

Figure 5:
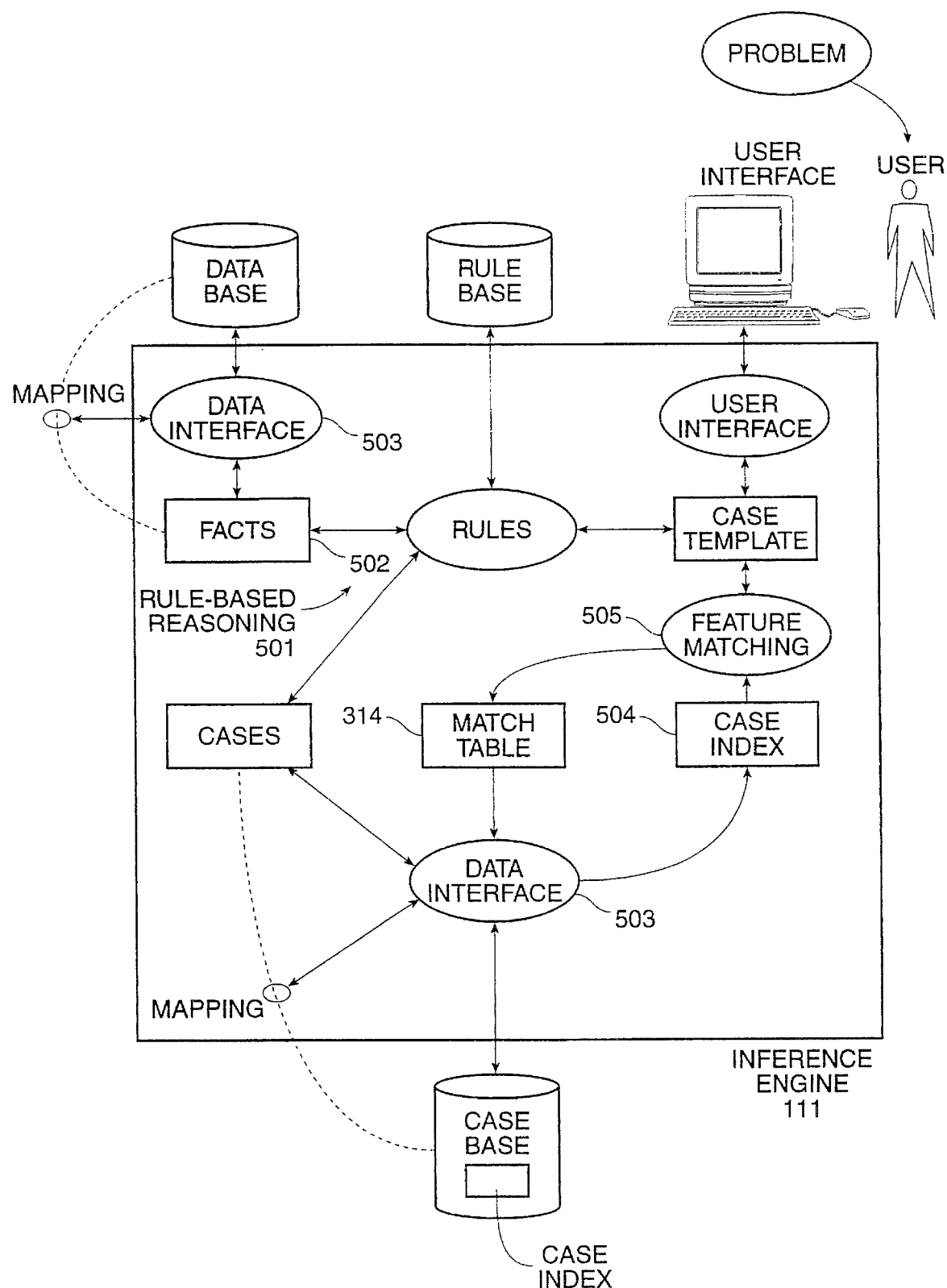
FIG. 5 shows a block diagram of a case-based reasoning system implemented within a rule-based reasoning system.

FIG. 5 shows a block diagram of a case-based reasoning system 101 implemented within a rule-based reasoning system.

In a preferred embodiment, the inference engine 111 for the case-based reasoning system 101 may be implemented within a rule-based reasoning system 501, such as the ART-IM rule-based reasoning system, manufactured by Inference Corporation of El Segundo, Calif. In the rule-based reasoning system 501, rules 103 may be matched against software objects 112, including a set of facts 502, cases 105 and the case template 312, and may perform procedural actions on them. Software objects 112 may comprise data elements and relations to other software objects 112, as is well known in the art. Object-oriented systems are more fully described in "Object-Oriented Design With Applications" by Grady Brooch, published by Benjamin/Cummings Publishing, Redwood City, Calif. (1991), hereby incorporated by reference as if fully set forth herein.

In a preferred embodiment, cases 105 may be implemented as software objects 112, such as a "schema" in ART-IM. Each case 105 may comprise its attribute-value pairs 303 and its relations to other software objects 112. For example, parameters of some problem 311 may be attributes 301 of some case 105. Moreover, the prescribed action 309 for the case 105 may be the ACTION attribute 301 or some other attribute 301. Its value 302 may be a text string describing the action 309, or may be another type of software object 112 to which the inference engine 111 may apply rules 103 or procedural structures 117.

The inference engine 111 may be coupled to the data base 106 by means of a data interface 503. In a preferred embodiment, the data interface 503 may maintain the mapping 114 between the data records 108 of the data base 106 and the representative objects 115 representing those data records 108. The data interface 503 may comprise procedural structures 117 for defining the format of the data records 108 in the secondary memory 109, for allocating and deallocating memory in the processor 110 to record representative objects 115, and for defining the format of the mapping 114 between the data records 108 and representative objects 115.

For example, the data interface 503 may define data records 108 to comprise a sequence of bytes indicating a numeric data type, allocate memory in the processor 110 for a software object 112 with a numeric data type, and map the data records 108 to that software object 112. With the data interface 503, the inference engine 111 may operate on that software object 112 as if it were immediately available to the processor 110, rather than in the secondary memory 109.

A preferred data interface 503 is more fully described in "ART-IM Reference Manual" available from Inference Corporation of El Segundo, Calif., and hereby incorporated by reference as if fully set forth herein.

The inference engine 111 may also be coupled to the case base 104 by means of the data interface 503. Cases 105 may be recorded in the secondary memory 109, and may be mapped to the memory in the processor 110 so the inference engine 111 may manipulate them as software objects 112. In a preferred embodiment, the data interface 503 may compile a case index 504 from the case base 104, which may comprise one or more signature files 307 (as in FIG. 3A) or hash tables 320 (as in FIG. 3B). The case index 504 may also be partly or fully recorded in the secondary memory 109 with the case base 104, and may be moved from one processor 110 to another, with or without the case base 104.

The inference engine 111 may perform a flow diagram with the data interface 503 like that disclosed with FIG. 2. Facts about the problem 311 may be gleaned from the user 119 by means of the user interface 118 and recorded in the case template 312. The case template 312 may be matched against the case base 104 using the case index 504 with a feature-matching procedure 505 like that disclosed with FIG. 3A or 3B. Some number of cases 105 may be recorded in the match table 314 by the feature-matching procedure 505, of which one may be the "best" case 204. As the inference engine 111 is implemented within the rule-based reasoning system 501, it may also apply rules 103 or procedural structures 117 to the case template 312 before matching, and to the matched cases 105 after matching.

In a preferred embodiment, the inference engine 111 may add new cases 105 to the case base 104 when it determines that they are needed. In the case-matching step 202 or in the best-case step 203, the inference engine 111 may determine that there is no case 105 which is a good match for the case template 312. The inference engine 111 may create a new case 105 which partly or fully copies the case template 312, and may ask the user 119 (by means of the user interface 118) what the prescribed action 309 for the case 105 should be. The inference engine 111 may add the new case 105 to the case base 104 and proceed to another problem 311 with an augmented case base 104.

The inference engine 111 may also add new cases 105 to the case base 104 without asking the user 119. When the inference engine 111 determines that there is no case 105 which is a good match for the case template 312, it may invoke a rule 103 or a procedural structure 117 which creates a new case 105, which may partly or fully copy the case template 312. Since cases 105 are software objects 112, a rule 103 may create a new case 105 and may assign a value 302 to the ACTION attribute 301 (as well as to other attributes 301).

In the note-action step 205, the inference engine 111 may also determine that the case template 312 matches one or more cases 105 in the case base 104, but that the actions 309 prescribed by those cases 105 are incorrect. For example, the inference engine 111 may invoke rules 103 which check that the action 309 for the "best" case 204 is inconsistent with known facts 502, or the inference engine 111 may maintain a subsequent history with the case 105 and invoke rules 103 which determine if the action 309 taken was successful, or the inference engine 111 may ask the user 119 at a later time if the action 309 taken was successful.

The inference engine 111 may also remove cases 105 from the case base 104 when it determines that those cases 105 are poor or obsolete. In the note-action step 205, should the inference engine 111 determine that the action 309 for the "best" case 204 is incorrect (e.g., by techniques noted herein) it may determine that the case 105 is no longer a good exemplar case 105 and may remove it from the case base 104. The inference engine 111 may proceed to the next problem 311 with a corrected case base 104.

Figure 6:
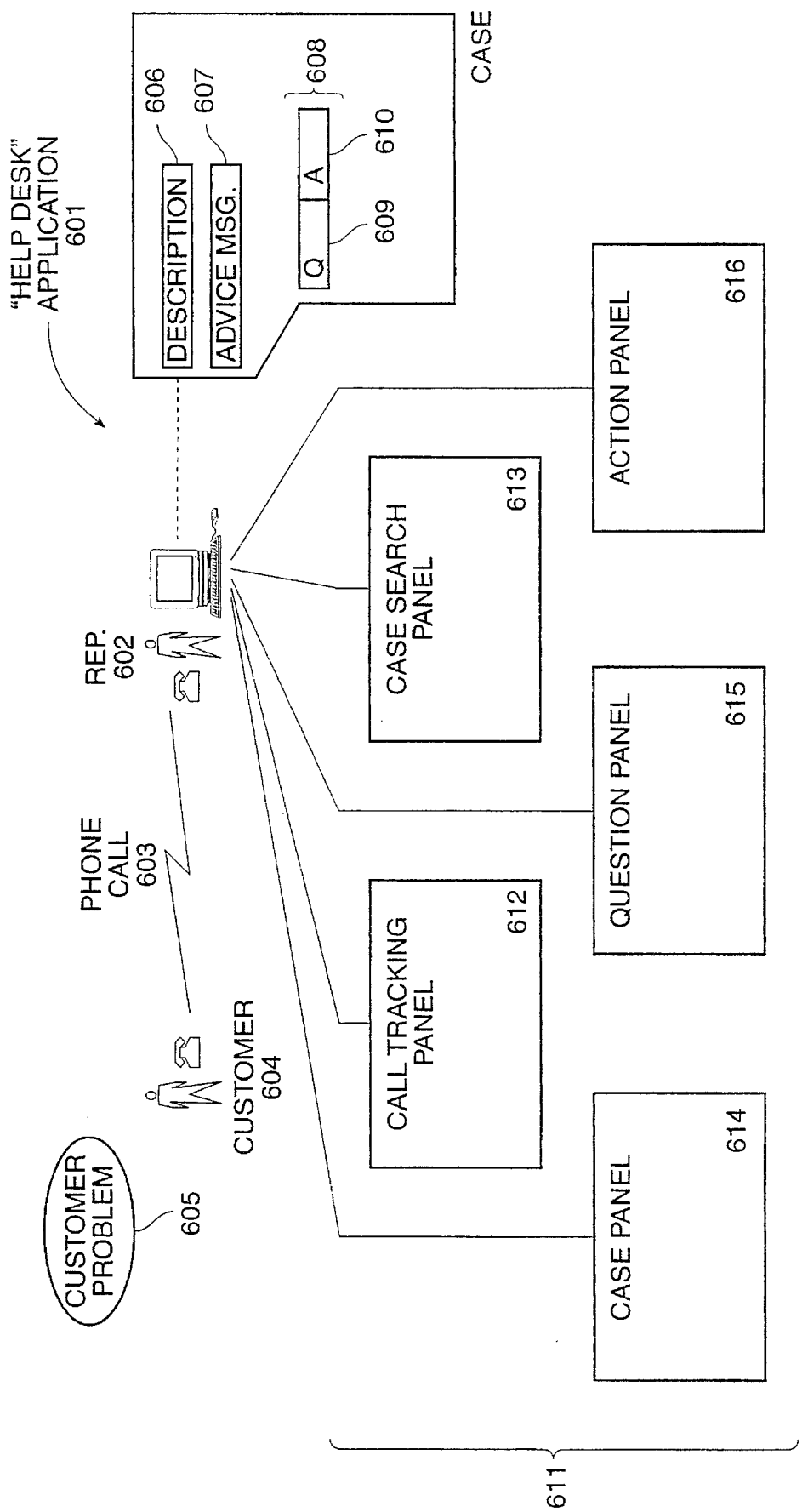
FIG. 6 shows an example case-based reasoning system for providing user help on call-in complaints.

FIG. 6 shows an example case-based reasoning system 101 for providing user help on call-in complaints.

One application field for case-based reasoning systems 101 may comprise an automated "help desk" application 601 for assisting a company's customer service personnel in giving advice to customers who call in with problems or questions. Automated help desk systems typically comprise a telephone call management system, a problem tracking database, and on-line documentation. Using case-based reasoning to identify similar problems and record advice for such problems would provide for a quicker and more reliable automated help desk system.

In the automated help desk application 601, the user 119 may comprise a customer service representative 602, who may typically be receiving a telephone call 603 from a customer 604. A set of customer problems 605 and advice to respond with may be stored as cases 105. Attributes 301 of the cases 105 may include features of the customer problems 605. In addition to matching on the description 606, the application 601 may ask questions and obtain answers which allow it to determine which case 105 is the "best" case 204, and thus to provide appropriate advice.

The automated "help desk" application 601 may perform a flow diagram like that disclosed with FIG. 2, with some modifications. In the description step 201, the application 601 may retrieve a text string description 606 of the customer problem 605. In the case-matching step 202, the application 601 may attempt to match the customer problem 605 to one or more cases 105 in the case base 104 using just the description 606 of the customer problem 605. If the match quality 315 of the case 105 which are matched is high, the application 601 may perform the best-case step 203 and following steps. The action 309 which the application 601 performs is to provide an advice message 607 to the customer service representative 602, who may then provide advice to the customer 604.

However, it may occur that cases 105 which are matched all have low match quality 315. The application 601 may collect a set of question-answer pairs 608 from the cases 105 which are matched. The application 601 may present a set of questions 609 from the question-answer pairs 608 to the customer service representative 602, who would provide a set of answers 610 to the application 601 (typically by asking the customer 604). The application 601 may perform the case-matching step 202 with the question-answer pairs 608 as additional attribute-value pairs 303 to match. In a preferred embodiment, weights may be assigned to the description 606 and to each question-answer pair 608.

If no "best" case 204 can be matched even with the question-answer pairs 608, the application 601 may create a new case 105 which copies the case template 312 and ask the customer service representative 602 for the advice message 607 to include with the case 105. In a preferred embodiment, the application 601 may be operated with few cases 105 or even no cases 105 to start with, since the application 601 may create new cases 105 when there is no "best" case 204 in the case base 104.

In a preferred embodiment, the application 601 may communicate with the user 119 by means of a set of display panels 611. Each panel 611 may comprise a display window which may present information to, and/or request information from, the user 119, typically with a form to be completed. Each panel 611 may comprise data fields which the user 119 may read or write, plus command icons which the user 119 may indicate (with a pointing device such as a mouse) to tell the application 601 to perform those commands. In a preferred embodiment, the application 601 may present the panel 611 which is appropriate to the case-based reasoning step it is performing, or the user 119 may direct the application 601 to display particular panels 611.

In a preferred embodiment, the panels 611 may also present and/or request graphical information, such as an electronic circuit diagram or an exploded view of an automobile. The panels 611 may also present information in hypertext format, as is well known in the art. Thus, the user 119 may request more information about a particular segment of text by identifying that segment (e.g., with a pointing device such as a mouse) and requesting that the application 601 display more information.

Figure 6A:

A call tracking panel 612 may present and/or request information relating to customers 604 who call and the telephone calls 603 they have made to the customer service representative 602. Thus, the user 119 may identify new customers 604 and new telephone calls 603 using the call tracking panel 612. FIG. 6A shows the call tracking panel 612 in detail.

A case search panel 613 may present and/or request information relating to the customer problem 605. Thus, the user 119 may define the case template 312 using the case search panel 613. The customer service representative 602 may also answer questions by means of the case search panel 613. FIG. 6B shows the case search panel 613 in detail.

A case panel 614 may present and/or request information relating to new cases 105. Thus, the user 119 may define new cases 105 using the case panel 614. The case panel 614 may typically be used by users 119 who are experts on the company's product, and the customer service representative 602 may not need to use the case panel 614 at all. FIG. 6C shows the case panel 614 in detail.

Figure 6D:
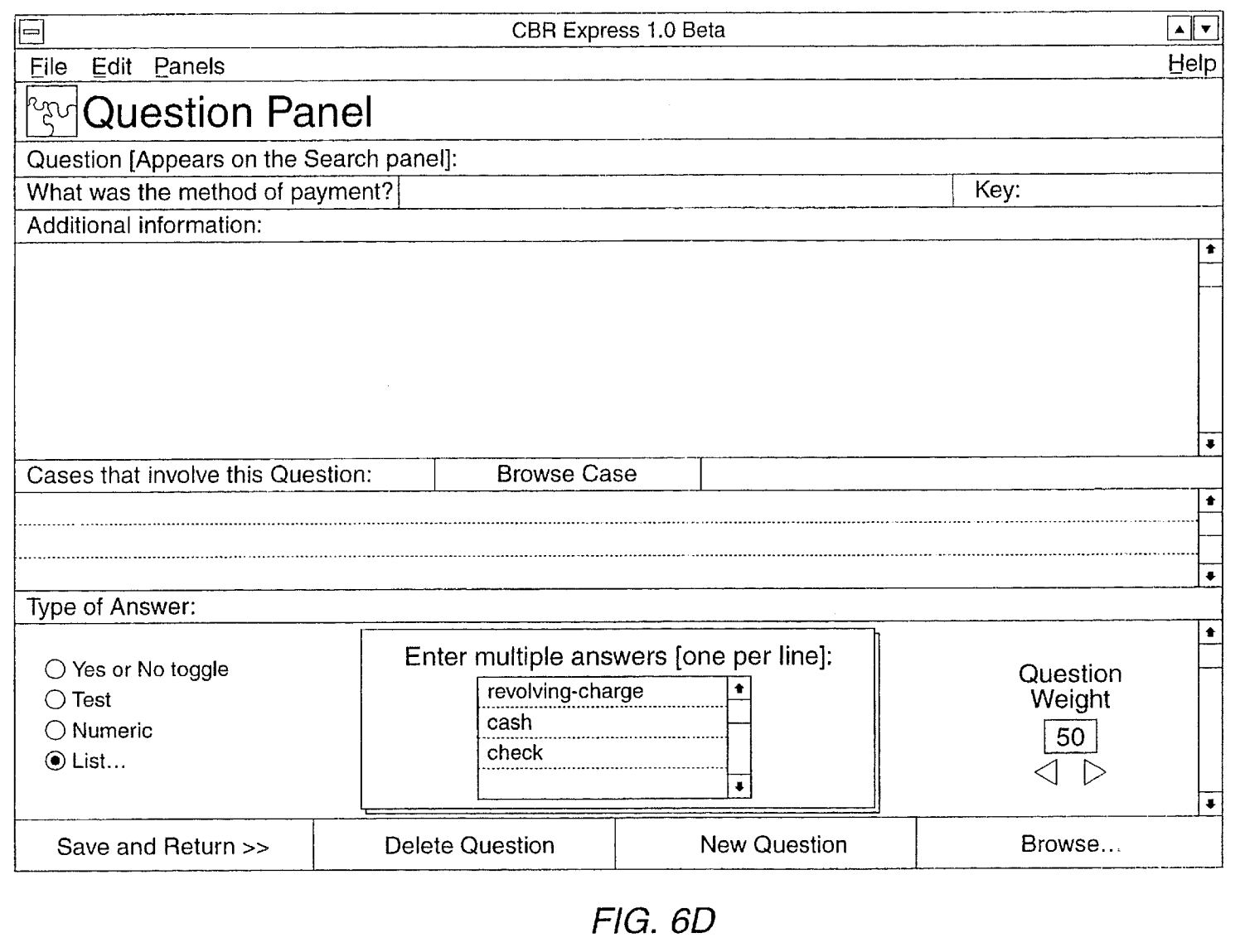

A question panel 615 may present and/or request information relating to question-answer pairs 608. Thus, the user 119 may create new questions 609 and record possible answers 610 for cases 105, using the question panel 615. The question panel 615 may typically be used by users 119 who are experts on the company's product, and the customer service representative 602 may not need to use the question panel 615 at all. FIG. 6D shows the question panel 615 in detail.

An action panel 616 may present and/or request information relating to actions 309. Thus, the user 119 may create new actions 309 or alter old actions 309 using the action panel 616. The action panel 616 may typically be used by users 119 who are experts on the company's product, and the customer service representative 602 may not need to use the action panel 616 at all. FIG. 6E shows the action panel 616 in detail.

A preferred example case-based reasoning system 101 for providing user help on call-in complaints is more fully described in "CBR Express User's Guide", available from Inference Corporation of El Segundo, Calif., and hereby incorporated by reference as if fully set forth herein.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts; and an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template;

wherein said inference engine comprises a set of software objects which correspond to said cases and said data items and wherein said system comprises a data interface comprising means for maintaining a mapping between said data items and a first set of representative software objects, and means for maintaining a mapping between said cases and a second set of representative software objects.

2. A system as in claim 1, wherein said inference engine comprises means for selecting a case which is a best match for said problem template; and means for selecting an action which differs from an action prescribed for that case in response to said data items external to said facts said problem template and external to said derived facts.

3. A system as in claim 2, wherein said means for selecting a case comprises means for retrieving a set of matching cases for said problem template, and said means for selecting an action comprises means for performing rule-based reasoning steps on said set of matching cases.

4. A system as in claim 1, wherein said inference engine comprises means for adding a new case to said case base in response to a plurality of problem templates which said system encounters.

5. A system as in claim 4, wherein said new case comprises at least one attribute-value pair which is copied from an unmatched problem template.

6. A system as in claim 4, wherein said new case comprises at least one attribute-value pair which is input from a human operator.

7. A system as in claim 4, wherein said inference engine comprises means for adding a new case to said case base, wherein said new case matches an unmatched problem template and wherein an action for said new case is externally input.

8. A system as in claim 1, wherein said inference engine comprises means for removing an old case from said case base in response to a set of problems which said system encounters.

9. A system as in claim 1, comprising a case base which has been constructed substantially by adding new cases in response to a set of unmatched problem templates.

10. A system as in claim 1, comprising a case base which has been constructed substantially by adding new cases in response to external input.

11. A system as in claim 2, comprising a case base which has been constructed substantially by adding new cases and removing old cases from a predetermined case base, in response to a set of problems which said system encounters.

12. A system as in claim 1, wherein said inference engine comprises a data interface comprising means for maintaining a case index.

13. A system as in claim 1, wherein said inference engine comprises a case index transported from a second case-based reasoning system.

14. A system as in claim 1, wherein said inference engine comprises a data interface which comprises for maintaining a mapping between said software objects and said cases, and comprises means for maintaining a mapping between said software objects and said data items.

15. A system as in claim 1, wherein said inference engine comprises means for constructing said problem template in response to a request for information from an external source.

16. A system as in claim 15, wherein said means for constructing said problem template comprises means for soliciting information from a human operator.

17. A system as in claim 1, wherein said inference engine comprises means for matching said problem template against said case base.

18. A system as in claim 17, wherein said means for matching comprises a case index.

19. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts; and an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template;

wherein said inference engine comprises a data interface which is responsive to a match table of said cases.

20. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts; and an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template;

wherein said inference engine comprises means for constructing said problem template in response to a request for information from an external source;

wherein said means for constructing said problem template comprises means for engaging a human operator in a question-answer dialogue.

21. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts; and an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template;

wherein said inference engine comprises means for matching said problem template against said case base;

wherein said means for matching comprises a match table.

22. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts;

an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template; and means for performing a method of matching a problem template to a case base, said method comprising the steps of first generating a set of signature bits in response to at least one attribute-value pair for each case in said case base;

second generating a set of signatures, one for each said case, in response to said set of signature bits;

recording a signature file having at least one mapping from said set of signatures to said cases;

third generating a set of test bits for said problem template; and searching said signature file in response to said test bits.

23. A system as in claim 22, wherein said first generating step comprises applying at least one signature function to said at least one attribute-value pair.

24. A system as in claim 22, wherein said third generating step comprises applying at least one signature function to at least one attribute-value pair for said problem template.

25. A system as in claim 22, wherein said at least one attribute-value pair comprises an attribute with a data type selected from the group: numeric, boolean, list structure, array structure, text string, multiple-choice.

26. A system as in claim 22, wherein said third generating step is responsive to at least one numeric range for an attribute-value pair with a numeric data type.

27. A system as in claim 22, wherein said third generating step generates a first test bit in response to whether a value in said attribute-value pair falls within a first range and generates a second test bit in response to whether said value falls within a second range.

28. A system as in claim 22, wherein said third generating step is responsive to string matching, word matching, or character matching, for an attribute-value pair with a text string data type.

29. A system as in claim 22, wherein said third generating step generates a set of test bits in response to at least one substring of a value in an attribute-value pair with a text string data type.

30. A system as in claim 29, wherein said at least one substring comprises a set of words found in a said value.

31. A system as in claim 29, wherein said at least one substring comprises a set of trigrams found in said value.

32. A system as in claim 29, wherein said at least one substring comprises at least one substring of said value after a predetermined set of characters has been removed from said value.

33. A system as in claim 22, wherein a set of cases which are matched are recorded in a match table.

34. A system as in claim 22, wherein a set of cases which are matched are evaluated for quality of match.

35. A system as in claim 22, wherein said third generating step is responsive to a plurality of values in an attribute-value pair with a multiple-choice data type.

36. A case-based reasoning system, comprising a rule base having a plurality of inferential rules;

a case base having a plurality of exemplar cases;

a data base having a plurality of data records having a plurality of data items external to a set of facts in a problem template and external to a set of derived facts concluded from said set of facts;

an inference engine comprising means for performing case-based reasoning steps on said cases and said problem template, and comprising means for performing rule-based reasoning steps on said data items external to said set of facts in said problem template and external to said derived facts using said rules in a unified automated reasoning system;

wherein said inference engine comprises means for matching said problem template having a set of facts to said case base; and means for applying said rules to said cases, said data items in said data records external to said set of facts in said problem template and external to said derived facts, and said facts in said problem template; and means for performing a method of matching a problem template to a case base, said method comprising the steps of first generating a case location in a hash table in response to at least one attribute-value pair for each case in said case base;

recording at least one pointer to a case in each one of said case locations;

second generating at least one problem locationin said hash table in response to at least one problem attribute-value pair; and selecting among a set of cases pointed to by said pointers found in said hash table at said at least one problem location.

37. A system as in claim 36, wherein said first generating step comprises applying a hash function to said at least one attribute-value pair.

38. A system as in claim 36, wherein said second generating step comprises applying a hash function to said at least one problem attribute-value pair.

* * * * *

UNITED STATES PATENT AND TRADEMARK OFFICE
CERTIFICATE OF CORRECTION

PATENT NO. : 5,581,664
DATED : December 3, 1996
INVENTOR(S) : Bradley P. Allen, S. Daniel Lee It is certified that error appears in the above-indentified patent and that said Letters Patent is hereby corrected as shown below:

On title page item [56], other publications lines 1 & 5, page 2, col. 1, line 10, delete "Workship" insert --Workshop--
page 2, col. 1, line 54, delete "Sofware" insert --Software--;
page 2, col. 2, line 2, delete "Retrieival" insert --Retrieval--;
page 2, col. 2, line 40, delete "Knowledged" insert --Knowledge--;
page 2, col. 2, line 59, delete "Intellignece" insert --Intelligence--;
page 3, col. 2, line 8, delete "Adressable" insert --Addressable--; and
page 3, col.2, line 14, start "U.S. Naval ..." on newline.

Col. 1, line 36, replace "Changes" with --changes--.

Col. 2, line 46, after "field" delete "may".

Col. 6, line 32, after "removed" insert --.--.

Col. 11, line 18, after "facts" insert --in--.

Col. 11, line 57, after comprises insert --means--.

Col. 14, line 55, replace "locationin" with --location in--.

Col. 9, line 25, replace "case" with --cases--.

Signed and Sealed this

Eighth Day of April, 1997

*Attest:*

BRUCE LEHMAN

*Attesting Officer*   Commissioner of Patents and Trademarks